(12) United States Patent
McNutt et al.

(10) Patent No.: US 7,648,414 B2
(45) Date of Patent: Jan. 19, 2010

(54) SYSTEMS AND METHODS FOR RECOGNIZING PREFERRED WAGERERS

(75) Inventors: Richard E McNutt, Lafyette, CO (US); Douglas V Ramsey, Louisville, CO (US)

(73) Assignee: ODS Properties, Inc., Los Angeles, CA (US)

( * ) Notice: Subject to any disclaimer, the term of this patent is extended or adjusted under 35 U.S.C. 154(b) by 1056 days.

(21) Appl. No.: 09/827,657

(22) Filed: Apr. 5, 2001

(65) Prior Publication Data

US 2001/0036858 A1  Nov. 1, 2001

Related U.S. Application Data

(60) Provisional application No. 60/194,804, filed on Apr. 5, 2000.

(51) Int. Cl.
  *A63F 9/24* (2006.01)
  *A63F 13/00* (2006.01)
  *G06F 17/00* (2006.01)
  *G06F 19/00* (2006.01)

(52) U.S. Cl. .............................. 463/25; 463/16; 463/20; 463/40; 473/274; 283/67

(58) Field of Classification Search ..................... 463/6, 463/25, 10–13, 16–29, 39, 40, 41, 42; 700/50, 700/51, 90–93; 273/138.2, 148 R, 148 B, 273/237, 246; 472/85, 86; 473/259, 274
See application file for complete search history.

(56) References Cited

U.S. PATENT DOCUMENTS

| | | | | |
|---|---|---|---|---|
| 3,909,002 A | * | 9/1975 | Levy | 463/26 |
| 4,033,588 A | | 7/1977 | Watts | 273/138 A |
| 4,108,361 A | | 8/1978 | Krause | 235/375 |
| 4,322,612 A | * | 3/1982 | Lange | 463/28 |
| 4,339,798 A | | 7/1982 | Hedges et al. | 364/412 |
| 4,372,558 A | | 2/1983 | Shimamoto et al. | 273/238 |
| 4,494,197 A | | 1/1985 | Troy et al. | 364/412 |
| 4,593,904 A | | 6/1986 | Graves | 273/1 E |
| 4,636,951 A | | 1/1987 | Harlick | 364/412 |
| 4,652,998 A | | 3/1987 | Koza et al. | 364/412 |
| 4,689,742 A | | 8/1987 | Troy et al. | 364/412 |
| 4,694,490 A | | 9/1987 | Harvey et al. | 380/234 |

(Continued)

FOREIGN PATENT DOCUMENTS

AU      24975/99 B2    11/1999

(Continued)

OTHER PUBLICATIONS http://www.slotmachinesabc.com/terminology/termsip.html Feb. 23, 2006, cited as evidence not as art. See specifically definition of a pay table describing a prize selection algorithm.*

(Continued)

*Primary Examiner*—John M. Hotaling, II
*Assistant Examiner*—Paul A. D'Agostino
(74) *Attorney, Agent, or Firm*—Ropes & Gray LLP

(57) ABSTRACT

Systems and methods for recognizing preferred wagerers are provided. These systems and methods monitor wagerers using a wagering system, determine whether a wagerer is to be recognized, and, if so, provide an incentive to the wagerer.

28 Claims, 3 Drawing Sheets

U.S. PATENT DOCUMENTS

| | | | |
|---|---|---|---|
| 4,704,725 A | 11/1987 | Harvey et al. ............... 380/9 |
| 4,706,121 A | 11/1987 | Young ....................... 358/142 |
| 4,745,468 A | 5/1988 | Von Kohorn ............... 358/84 |
| 4,747,600 A | 5/1988 | Richardson ................ 273/269 |
| 4,760,527 A | 7/1988 | Sidley ......................... 364/412 |
| 4,764,666 A | 8/1988 | Bergeron ..................... 235/380 |
| 4,799,683 A | 1/1989 | Bruner, Jr. ................ 273/138 A |
| 4,815,741 A | 3/1989 | Small ........................ 273/138 A |
| 4,882,473 A | 11/1989 | Bergeron et al. ............ 235/380 |
| 4,922,522 A | 5/1990 | Scanlon ...................... 379/95 |
| 4,926,255 A | 5/1990 | Von Kohorn ............... 358/84 |
| 4,926,327 A | 5/1990 | Sidley ......................... 364/412 |
| 4,962,950 A * | 10/1990 | Champion ................. 283/67 |
| 4,965,825 A | 10/1990 | Harvey et al. ............. 380/233 |
| 4,969,183 A | 11/1990 | Reese ......................... 379/88 |
| 4,996,705 A | 2/1991 | Entenmann et al. ......... 379/91 |
| 5,007,649 A | 4/1991 | Richardson ................ 273/237 |
| 5,034,807 A | 7/1991 | Von Kohorn ............... 358/84 |
| 5,054,787 A | 10/1991 | Richardson ................ 273/369 |
| 5,057,915 A | 10/1991 | Von Kohorn ............... 358/84 |
| 5,083,271 A | 1/1992 | Thacher et al. ............ 364/411 |
| 5,083,272 A | 1/1992 | Walker et al. ............. 364/412 |
| 5,083,800 A | 1/1992 | Lockton ..................... 273/439 |
| 5,096,195 A | 3/1992 | Gimmon ..................... 273/138 |
| 5,096,202 A | 3/1992 | Hesland ..................... 273/237 |
| 5,112,050 A | 5/1992 | Koza et al. ................. 273/139 |
| 5,119,295 A | 6/1992 | Kapur ......................... 364/412 |
| 5,178,389 A | 1/1993 | Bentley et al. ............. 273/138 |
| 5,186,471 A | 2/1993 | Vancraeynest .............. 273/439 |
| 5,218,631 A | 6/1993 | Katz ........................... 463/41 |
| 5,227,874 A | 7/1993 | Von Kohorn ............... 358/84 |
| 5,233,654 A | 8/1993 | Harvey et al. ............. 380/20 |
| 5,249,044 A | 9/1993 | Von Kohorn ............... 358/86 |
| 5,276,312 A | 1/1994 | McCarthy ................... 235/380 |
| 5,280,426 A | 1/1994 | Edmonds ..................... 364/408 |
| 5,282,620 A | 2/1994 | Keesee ....................... 273/138 |
| 5,283,734 A | 2/1994 | Von Kohorn ............... 364/412 |
| 5,286,023 A | 2/1994 | Wood ......................... 273/138 |
| 5,297,802 A | 3/1994 | Pocock et al. .............. 273/439 |
| 5,326,104 A | 7/1994 | Pease et al. ................. 273/138 |
| 5,327,485 A | 7/1994 | Leaden ....................... 379/95 |
| 5,333,868 A | 8/1994 | Goldfarb ..................... 273/138 |
| 5,340,119 A | 8/1994 | Goldfarb ..................... 273/439 |
| 5,351,970 A | 10/1994 | Fioretti ....................... 273/439 |
| 5,354,069 A | 10/1994 | Guttman et al. ............ 273/439 |
| 5,365,575 A | 11/1994 | Katz ........................... 379/92 |
| 5,398,932 A | 3/1995 | Eberhardt et al. ........... 273/138 |
| 5,403,999 A | 4/1995 | Entenmann et al. ........ 235/379 |
| 5,408,417 A | 4/1995 | Wilder ....................... 364/479 |
| 5,415,416 A | 5/1995 | Scagnelli et al. ........... 273/439 |
| 5,417,424 A | 5/1995 | Snowden et al. ........... 273/138 |
| 5,505,449 A | 4/1996 | Eberhardt et al. ........... 273/138 |
| 5,507,489 A | 4/1996 | Reibel et al. ............... 273/138 |
| 5,518,253 A | 5/1996 | Pocock et al. .............. 273/439 |
| 5,539,450 A | 7/1996 | Handelman ................. 348/12 |
| 5,539,822 A | 7/1996 | Lett ........................... 380/20 |
| 5,545,088 A | 8/1996 | Kravitz et al. ............. 463/40 |
| 5,564,977 A | 10/1996 | Algie ......................... 463/25 |
| 5,569,083 A | 10/1996 | Fioretti ....................... 463/19 |
| 5,573,244 A | 11/1996 | Mindes ....................... 463/26 |
| 5,575,474 A | 11/1996 | Rossides ..................... 463/26 |
| 5,577,727 A | 11/1996 | Brame et al. ............... 273/139 |
| 5,586,937 A | 12/1996 | Menashe ..................... 463/41 |
| 5,608,785 A | 3/1997 | Kasday ....................... 379/90 |
| 5,643,088 A | 7/1997 | Vaughn et al. ............. 463/40 |
| 5,647,795 A | 7/1997 | Stanton ....................... 463/1 |
| 5,679,077 A | 10/1997 | Pocock et al. .............. 463/19 |
| 5,683,090 A | 11/1997 | Zeile et al. ................. 273/269 |
| 5,688,174 A | 11/1997 | Kennedy .................... 463/37 |
| 5,713,795 A | 2/1998 | Kohorn ....................... 463/17 |
| 5,722,890 A | 3/1998 | Libby et al. ................ 463/17 |
| 5,729,212 A | 3/1998 | Martin .................... 340/870.28 |
| 5,746,657 A | 5/1998 | Ueno ......................... 463/41 |
| 5,749,785 A | 5/1998 | Rossides ..................... 463/25 |
| 5,755,621 A | 5/1998 | Marks et al. ............... 463/42 |
| 5,759,101 A | 6/1998 | Von Kohorn ............... 463/40 |
| 5,761,547 A | 6/1998 | Hirano et al. |
| 5,761,647 A * | 6/1998 | Boushy ....................... 705/10 |
| 5,762,552 A | 6/1998 | Vuong et al. ............... 463/25 |
| 5,772,511 A | 6/1998 | Smeltzer ..................... 463/17 |
| 5,779,547 A | 7/1998 | SoRelle et al. |
| 5,787,156 A | 7/1998 | Katz ........................ 379/93.13 |
| 5,800,268 A | 9/1998 | Molnick ..................... 463/40 |
| 5,816,917 A | 10/1998 | Kelmer et al. ............. 463/16 |
| 5,816,919 A | 10/1998 | Scagnelli et al. ........... 463/25 |
| 5,823,879 A | 10/1998 | Goldberg et al. ............ 463/42 |
| 5,830,067 A | 11/1998 | Graves et al. .............. 463/40 |
| 5,830,068 A | 11/1998 | Brenner et al. ............. 463/42 |
| 5,830,069 A | 11/1998 | Soltesz et al. .............. 463/42 |
| 5,851,149 A | 12/1998 | Xidos et al. |
| 5,871,398 A | 2/1999 | Schneier et al. ............ 463/16 |
| 5,873,782 A * | 2/1999 | Hall ........................... 463/25 |
| 5,910,047 A | 6/1999 | Scagnelli et al. ........... 463/17 |
| 5,916,024 A | 6/1999 | Von Kohorn |
| 5,954,582 A | 9/1999 | Zach ......................... 463/25 |
| 5,957,775 A * | 9/1999 | Cherry ....................... 463/16 |
| 5,987,101 A | 11/1999 | Rathore et al. |
| 5,999,808 A | 12/1999 | LaDue ....................... 455/412 |
| 6,001,016 A | 12/1999 | Walker et al. ............. 463/42 |
| 6,003,013 A * | 12/1999 | Boushy et al. ............. 705/10 |
| 6,007,426 A | 12/1999 | Kelly et al. ............... 463/16 |
| 6,024,640 A | 2/2000 | Walker et al. ............. 463/17 |
| 6,024,641 A | 2/2000 | Sarno ......................... 463/17 |
| 6,030,288 A | 2/2000 | Davis et al. ............... 463/29 |
| 6,080,062 A | 6/2000 | Olson ......................... 463/42 |
| 6,080,063 A | 6/2000 | Khosla ....................... 463/42 |
| 6,099,408 A | 8/2000 | Schneier et al. ............ 463/29 |
| 6,102,797 A | 8/2000 | Kail ........................... 463/16 |
| 6,117,011 A | 9/2000 | Lvov ......................... 463/25 |
| 6,117,013 A | 9/2000 | Eiba ........................... 463/41 |
| 6,120,376 A * | 9/2000 | Cherry ....................... 463/16 |
| 6,152,824 A | 11/2000 | Rothschild et al. ......... 463/42 |
| 6,183,362 B1 * | 2/2001 | Boushy ....................... 463/25 |
| 6,186,892 B1 | 2/2001 | Frank et al. ............... 463/19 |
| 6,203,427 B1 | 3/2001 | Walker et al. ............. 463/16 |
| 6,251,016 B1 | 6/2001 | Tsuda et al. ............... 463/42 |
| 6,251,017 B1 | 6/2001 | Leason et al. .............. 463/42 |
| 6,254,480 B1 | 7/2001 | Zach ......................... 463/17 |
| 6,257,981 B1 * | 7/2001 | Acres et al. ................ 463/26 |
| 6,257,982 B1 | 7/2001 | Rider et al. ................ 463/31 |
| 6,263,054 B1 | 7/2001 | Haefliger .................. 379/93.13 |
| 6,264,560 B1 | 7/2001 | Goldberg et al. ............ 463/42 |
| 6,272,223 B1 | 8/2001 | Carlson ...................... 380/251 |
| 6,273,820 B1 | 8/2001 | Haste, III .................. 463/40 |
| 6,309,307 B1 * | 10/2001 | Krause et al. .............. 473/274 |
| 6,331,148 B1 * | 12/2001 | Krause et al. .............. 473/274 |
| 6,364,768 B1 * | 4/2002 | Acres et al. ................ 463/25 |
| 6,500,066 B1 * | 12/2002 | Bower et al. ............... 463/20 |
| 6,578,735 B1 * | 6/2003 | Mothwurf .................. 221/255 |
| 6,666,769 B2 * | 12/2003 | Stronach .................... 463/40 |
| 6,722,980 B2 * | 4/2004 | Stronach .................... 463/25 |
| 2001/0003099 A1 | 6/2001 | Von Kohorn ............... 463/40 |
| 2001/0003100 A1 | 6/2001 | Yacenda ..................... 463/41 |

FOREIGN PATENT DOCUMENTS

| | | |
|---|---|---|
| AU | 42788/00 B2 | 11/2000 |
| CA | 2270028 | 10/1999 |
| EP | 0 387 046 A2 | 9/1990 |
| EP | 0 583 196 A1 | 2/1994 |
| EP | 0 620 688 A2 | 10/1994 |
| EP | 0 624 039 A2 | 11/1994 |
| EP | 0 673 004 A2 | 9/1995 |
| EP | 0 873 772 A1 | 10/1998 |

| | | |
|---|---|---|
| EP | 0 934 765 A1 | 8/1999 |
| GB | 2 300 535 A | 11/1996 |
| JP | 01-25659 | 1/1989 |
| JP | 01-269157 | 10/1989 |
| JP | 02-110660 | 4/1990 |
| JP | 02-231671 | 9/1990 |
| JP | 06-325062 | 11/1994 |
| WO | WO 95/01058 | 1/1995 |
| WO | WO 95/30944 | 11/1995 |
| WO | WO-97/02074 | 1/1997 |
| WO | WO 97/19428 | 5/1997 |

OTHER PUBLICATIONS

You Bet Help File, Youbet.com, Inc., Los Angeles, California, last modified Jul. 11, 1998, pp. 1-132.

Maury Wolff, "Interactive Wagering A Good Bet," Daily Racing Form, Jan. 29, 1995, p. 4.

John Burgess, "And We're Off To The Races!" The Washington Post, Jan. 16, 1995, pp. 18-19.

Ross Peddicord, "New On TV: You Bet Your Horse," The Sun, Baltimore, Maryland, Dec. 15, 1994.

Yee-Hsiang Chang et al., "An Open-Systems Approach To Video On Demand," IEEE Communications Magazine, May 1994, pp. 68-80.

TrackMaster User's Guide Version 2.0.7, Apr. 1994, AXCIS Pocket Information Network, Inc., Santa Clara, California, pp. 1-122.

Tiny Tim Brochure, AutoTote Systems Inc., Newark, Delaware (undated).

Probe XL Brochure, AutoTote Systems, Inc., Newark, Delaware (undated).

Office Action from Canadian Application No. 2,404,251 dated Jun. 12, 2007, 5 pages.

US 5,823,877, 10/1998, Scagnelli et al. (withdrawn)

\* cited by examiner

SYSTEMS AND METHODS FOR RECOGNIZING PREFERRED WAGERERS

CROSS REFERENCE TO RELATED APPLICATION

The present application claims the benefit of U.S. Provisional Patent Application No. 60/194,804, filed Apr. 5, 2000, which is hereby incorporated by reference herein in its entirety.

BACKGROUND OF THE INVENTION

The present invention relates to systems and methods for recognizing preferred wagers. More particularly, the present invention relates to systems and methods for recognizing preferred wagerers that are using interactive wagering systems.

Interactive wagering systems, such as systems that facilitate wagering from a set-top box or a personal computer (PC), for example, have realized wide popularity. An example of such a wagering system is illustrated in Marshall et al. U.S. patent application Ser. No. 09/330,651, filed Jun. 11, 1999, which is hereby incorporated by reference herein in its entirety. As disclosed therein, a wagerer can use a set-top box, or other suitable device, such as a PC or Interactive Voice Response (IVR) system, to place a wager. The wagering event corresponding to the wager may be televised to enable wagerers and non-wagerers to participate in the excitement of the event. Because wagering systems seek to promote wagering, it is desirable to provide improvements in interactive wagering systems and corresponding television coverage of wagering events to induce and reward certain wagerers.

SUMMARY OF THE INVENTION

In accordance with this and other objects of the invention, systems and methods for recognizing preferred wagerers are provided. These systems and methods monitor wagerers using a wagering system, determine whether a wagerer is to be recognized, and, if so, provide an incentive to the wagerer. Whether a wagerer is to be recognized may be based upon any suitable parameter in accordance with the present invention. For example, a potential wagerer may be recognized the first time the wagerer activates a wagering interface. As another example, a wagerer may be recognized after placing his first bet, or after placing a bet having at least a certain size. As yet another example, wagerers that place a certain number or amount of total wagers in a given period may be recognized as "Very Important Persons" (VIPs). As a further example, a wagerer may be recognized simply by tuning or subscribing to a television wagering event. As a still further example, a wagerer may be recognized by making a certain size deposit to a wagering account. As a still further example, a wagerer may be recognized by making a referral to the wagering system. As a still further example, a wagerer may be recognized for having a given wagering history.

In order to determine when a wagerer should be recognized, a wagering system may monitor which wagerers are accessing wagering interfaces, placing wagerers, watching or subscribing to wagering programs, etc. This may be accomplished by the wagering system communicating with set-top boxes or televisions of wagerers and/or any other device, such as a PC or IVR system, that the wagerer may be using to access the wagering system.

Wagerers may be recognized using any suitable incentive. For example, the present invention may cause television personalities to greet wagerers in response to prompts generated automatically on a tele-prompter. Alternatively, the television personalities may be instructed to greet wagerers by television producers, who are prompted by the systems and methods of the present invention. As another example, an IVR system customer may hear a special greeting being made to him. Such a greeting may be the audio-only portion of the corresponding television broadcast. As yet another example, promotions may be extended to recognized wagerers. Promotions may include discounts for services, credits to accounts, free or discounted wagering, providing gifts (such as hats, t-shirts, etc.), frequent flyer miles, tickets to a race track, travel or hotel accommodations in connection with visiting a race track, special treatment at a race track, etc.

BRIEF DESCRIPTION OF THE DRAWINGS

Further features of the invention, its nature and various advantages will become more apparent from the following detailed description of the invention, taken in conjunction with the accompanying drawings, in which like reference characters refer to like parts throughout, and in which.

DETAILED DESCRIPTION OF THE PREFERRED EMBODIMENTS

The present invention is now described in connection with FIGS. 1-3.

Figure 1:
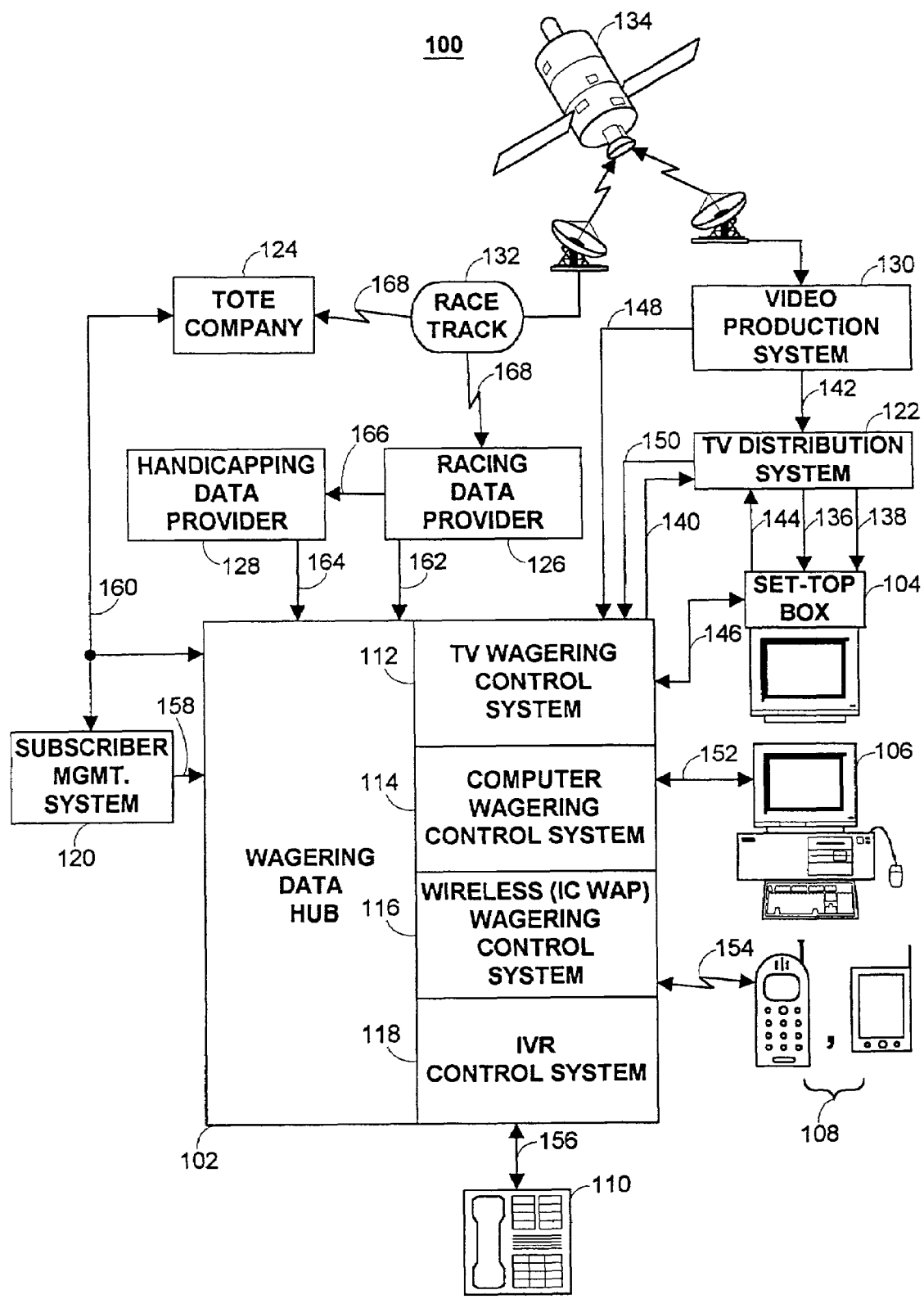
FIG. 1 is a block diagram of a wagering system that may be used in accordance with various embodiments of the present invention.

Turning to FIG. 1, an interactive wagering system 100 in accordance with the present invention is illustrated. Aspects of the invention apply to different types of wagering, but are primarily described herein in the context of interactive parimutuel wagering on racing (e.g., horse racing) for specificity and clarity. Obviously, any other suitable type of wagering (e.g., fixed-odds horse racing, sports book gambling, etc.) could also be implemented. As shown, system 100 includes a wagering data hub 102 that may control wagering in system 100 and that may be coupled to a television set-top box 104, a user computer 106, a wireless device 108 (e.g., a cellular telephone, a pager, a handheld device, a mobile computer, etc.), and a telephone 110. There may be more than one set-top box 104, computer 106, wireless device 108, and telephone 110, although only one of each has been shown to avoid over-complicating the drawing.

A wagerer using system 100 may receive information on wagering events and wagering accounts, and may place wagers related to those wagering events using set-top box 104, computer 106, wireless device 108, or telephone 110 coupled to hub 102. Each platform may receive wagering information from separate control systems in wagering data hub 102. For example, set-top box 104 may receive information from TV wagering control system 112, computer 106 may receive information from computer wagering control system 114, wireless device 108 may receive information from wireless wagering control system 116, and telephone 110 may receive information from interactive voice response (IVR) control system 118.

Wagering data hub 102 may also be connected to a subscriber management system 120, a television distribution system 122, a tote company 124, a racing data provider 126, and handicapping data provider 128. There may be more than one television distribution system 122, tote company 124, racing data provider 126, and handicapping data provider 128, although only one of each has been shown to avoid over-complicating the drawing.

In accordance with the present invention, set-top box 104 may be any suitable device for receiving data signals and video signals, processing the data signals, displaying at least a portion of the data signals and the video signals, and receiving user commands that may cause data signals to be transmitted to wagering data hub 102. For example, set-top box 104 may be a conventional set-top box, may be circuitry in videocassette recorders, personal video recorders, digital video disc players, or televisions, or may be any other suitable device.

Set-top box 104 may receive data signals from hub 102 via communication link 140, television distribution system 122, and communication link 136. These data signals preferably include data relating to wagering events and wagering accounts. Alternatively or additionally to receiving the data signals via link 140, system 122, and link 136, these signals may be received directly via communication link 146.

Set-top box 104 may also receive video signals from video production system 130 via communication link 142, television distribution system 122, and communication link 138. These video signals preferably include video relating to wagering events that originate at race track 132 and are transmitted to video production system 130 via satellite 134. There may be more than one race track 132, although only one has been shown to avoid over-complicating the drawing. Alternatively or additionally to receiving video signals via link 142, system 122, and link 138, video signals may be received from video production system 130 via communication link 148, hub 102, and link 146. Although links 136 and 138 are illustrated as separate paths for transmitting signals, each link may be part of a single communication mechanism (e.g., link 136 may transmit signals in the vertical blanking interval of a video signal carried in link 138).

Set-top box 104 may transmit wagering data signals to TV wagering control system 112 in wagering data hub 102 via communication link 144, television distribution system 122, and communication link 150, or directly via communication link 146. Communication link 146 may be a telephone connection, an Internet connection, or any other suitable connection. The signals received and transmitted by set-top box 104 may be any suitable type of analog signal, digital signal, or a combination of signals that are transmitted using any suitable method.

Television distribution system 122 and communication links 136, 138, 120, 142, 144, and 150 may all be part of a cable television system, a satellite television system, an over-the-air television system (including RF, microwave, etc.), a computer network (e.g., the Internet), a part of any suitable communication system, a combination of communication systems, or any other suitable system. Similar to links 136 and 138, link 144 may be incorporated with either link 136 or 138, or both as part of a single communication mechanism. Links 140 and 150 may also be incorporated together as part of a single communication mechanism if desired.

Computer 106 can connect to computer wagering control system 114 in hub 102 via computer network 152. Computer network 152 may be any suitable mechanism for connecting a computer to hub 102, such as a direct telephone connection, one or more telephone connections with a data network connection (such as an Internet connection or a connection provided by a computer network provider), or a direct data network connection.

Wireless device 108 may connect to wireless wagering control system 116 in hub 102 via wireless network 154. Wireless network 154 may be any suitable mechanism for connecting a cellular telephone, a pager, a handheld device, a computer, etc. to hub 102, such as a satellite transmitter/receiver system or a data network connection (such as an Internet connection or a connection provided by wireless network provider).

Telephone 110 may be coupled to IVR control system 118 in hub 102 via telephone line 156, or using any other suitable mechanism. Although telephone 110 is illustrated as a standard telephone, any type of device for receiving audio prompts that allows a wagerer to respond to the audio prompts (either by spoken word or key depression) may also be used.

Subscriber management system (SMS) 120 may enable an operator of the present invention to control user access to the services provided by hub 102. In addition to being connected to hub 102 by communication link 158, SMS 120 may be connected to tote company 124 via communication link 160. Communication links 158 and 160 may be any suitable mechanism for communicating data and may use any type of data transmission method. The connection to tote company 124 may enable SMS 120 to create and update wagering accounts that may be located at tote company 124. For instance, when a wagerer places a wager using one of set-top box 104, computer 106, wireless device 108, or telephone 110, hub 102 can access SMS 120 to verify that the wagerer is authorized to wager or that the wager is valid.

Tote company 124, racing data provider 126, and handicapping data provider 128 may be connected to hub 102 via communication links 160, 162, and 164, respectively. Tote company 124 may provide wagering event data and wagering history or information to hub 102. Tote company may also receive wagering information from hub 102. Racing data provider 126 may provide statistical data and handicapping data provider 128 may provide handicapping data to hub 102. Tote company 124 and racing data provider 126 may receive data from race track 132 via communication link 168, while handicapping data provider 128 may receive data from racing data provider 126 via communication link 166. Data received from and transmitted to tote company 124, racing data provider 126, and handicapping data provider 128 can be transmitted over communication links 160, 162, and 164, respectively. Communication links 160, 162, 164, 166, and 168 may be any suitable mechanism for transmitting data using any suitable method.

Figure 2:
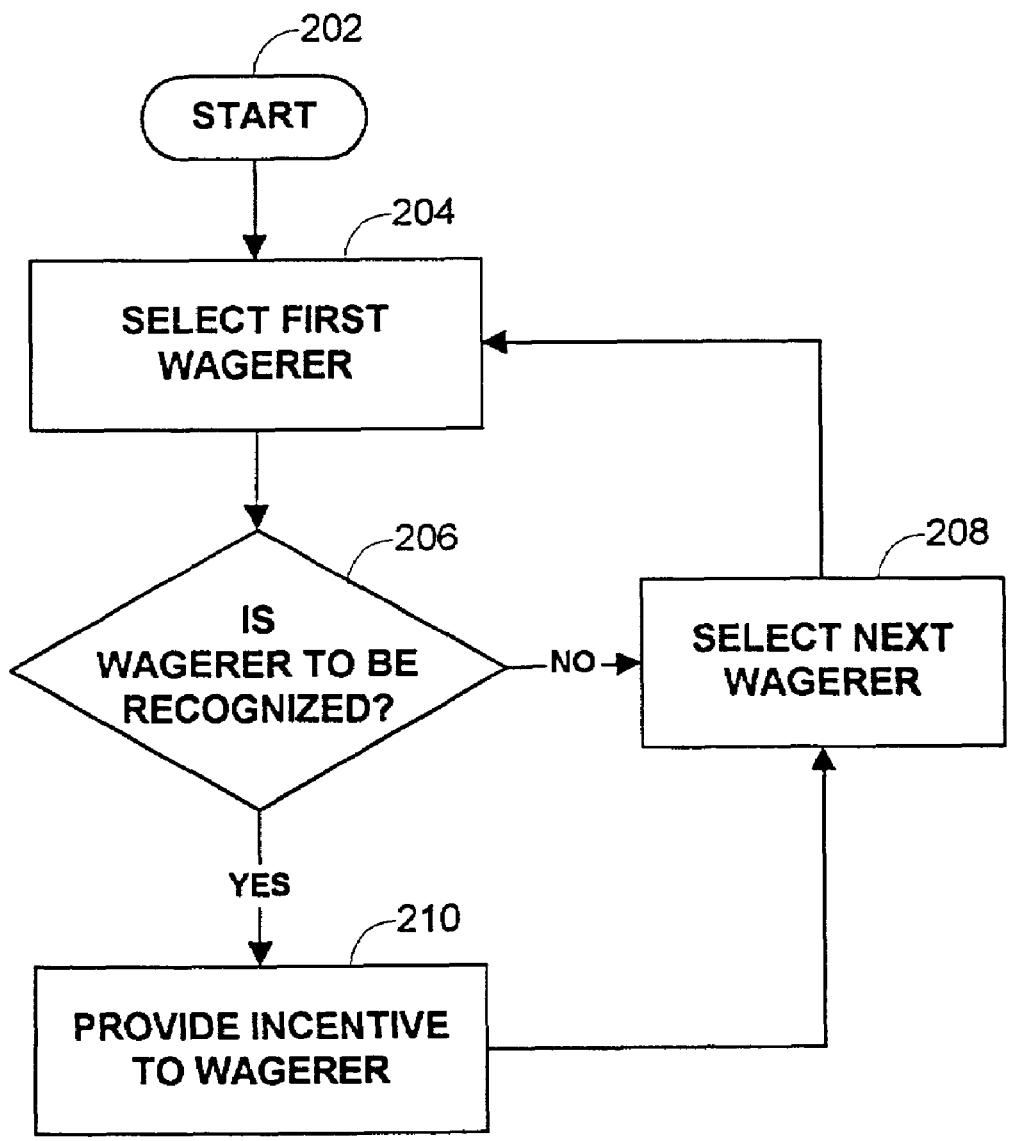
FIG. 2 is a flow diagram of a main process for determining whether to recognize a wagerer and for providing an incentive in accordance with various embodiments of the present invention.

Referring now to FIG. 2, a main process for recognizing wagerers and providing incentives to the wagerers is shown. This process is preferably executed on each on control systems 112, 114, 116, and 118 of system 100 of FIG. 1, although the process may be implemented on any suitable components of system 100 or any other wagering system.

After beginning at step 202, process 200 initially selects a first wagerer at step 204. This selection may be based upon any suitable criterion or criteria. For example, a first wagerer may be selected by the time that wagerer logged onto the system (e.g., select the wagerer that has been on the system the longest or select the next wagerer to log on). The wagerer may also be selected based upon account number, as another example.

Next, at step 206, process 200 determines whether the current wagerer is to be recognized. This may be based upon any suitable criterion or criteria. For example, a potential wagerer may be recognized the first time the wagerer activates a wagering interface. As another example, a wagerer may be recognized after placing his first bet, or after placing a bet having at least a certain size. As yet another example, wagerers that place a certain number or amount of total wagers in a given period may be recognized as "VIPs." As a further example, a wagerer may be recognized simply by tuning or subscribing to a television wagering event. As a still further example, a wagerer may be recognized by making a certain size deposit to a wagering account. As a still further example, a wagerer may be recognized by making a referral to the wagering system. As a still further example, a wagerer may be recognized for having a given wagering history.

In order to determine when a wagerer should be recognized, a wagering system may monitor which wagerers are accessing wagering interfaces, placing wagerers, watching or subscribing to wagering programs, etc. This may be accomplished by wagering control systems 112, 114, 116, and 118 communicating with set-top boxes 104 or televisions of wagerers and/or any other device, such as PCs 106 or handheld devices 108, that the wagerer may be using to access the wagering system.

If a wagerer is not to be recognized, then process 200 proceeds to step 208 to select the next wagerer. The next wagerer may be selected using any suitable criterion or criteria. For example, the wagerer that has been logged on for the next longest compared to the current wagerer may be selected. Once the next wagerer has been selected, process 200 loops back to step 206.

If it is determined that a wagerer is to be recognized at step 206, process 200 then proceeds to step 210 to provide an incentive to the wagerer. Wagerers may be recognized using any suitable incentive. For example, the present invention may cause television personalities to greet wagerers in response to prompts generated automatically on a teleprompter at a video production system 130. Alternatively, the television personalities may be instructed to greet wagerers by television producers, who are prompted by some other device at the video production system. As another example, an IVR system customer may hear a special greeting being made to him over telephone 110. Such a greeting may be the audio-only portion of the corresponding television broadcast. As yet another example, promotions may be extended to recognized wagerers. Promotions may include discounts for services, credits to accounts, free or discounted wagering, providing gifts (such as hats, t-shirts, etc.), frequent flyer miles, tickets to a race track, travel or hotel accommodations in connection with visiting a race track, special treatment at a race track, etc.

After providing the incentive to the wagerer, process 200 may branch to step 208 and perform that step as described above.

Figure 3:
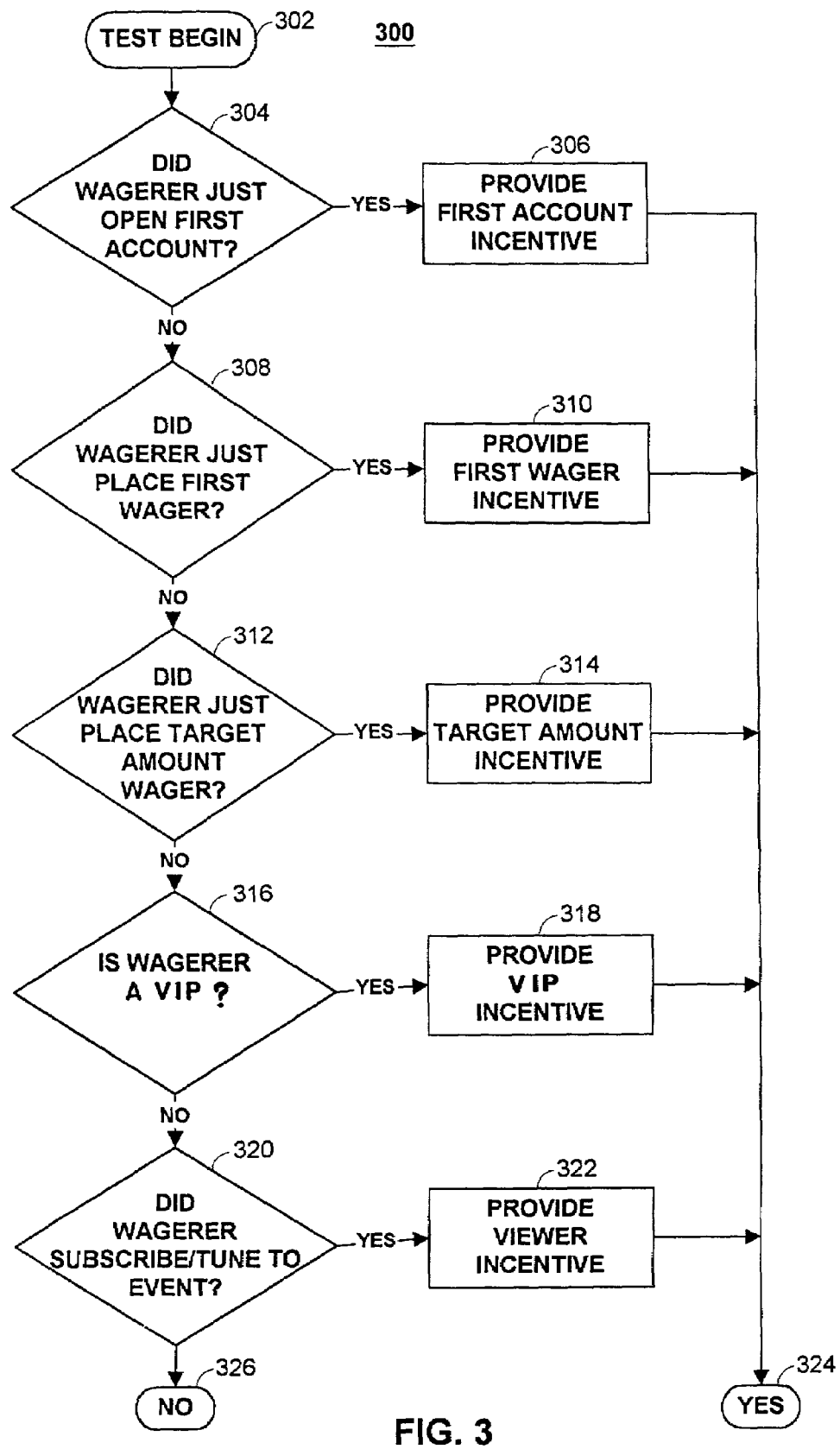
FIG. 3 is a flow diagram of a process for determining whether to recognize a wagerer and for determining which incentive to provide to the wagerer if recognized in accordance with various embodiments of the present invention.

FIG. 3 illustrates in more detail a process 300 that may be performed at step 206 of FIG. 2. As shown, after process 300 has begun at step 302, this process may first determine whether the wagerer just opened his or her first wagering account. If so, then process 300 may determine at step 306 that a first account incentive is to be provided. This incentive may be a free amount (e.g., $5 worth) of wagerers, or any other suitable incentive.

If process 300 determines at step 304 that the wagerer did not just open his or her first account, then process 300 may proceed to step 308 to determine if the wagerer just placed his first wager. If the process determines that the wagerer did just place his first wager, then process 300 may determine at step 310 that the wagerer is to be provided with a first wager incentive. This incentive may be a special congratulations and good luck message that is displayed on the wagerer's television screen or any other suitable incentive.

If process 300 determines at step 308 that the wagerer did not just place his or her first wager, then process 300 may proceed to step 312 to determine if the wagerer just placed a target amount wager. A target amount wager may be a single wager that meets or exceeds a given single wager threshold, may be a wager that causes the wagerer's cumulative wagering amount to exceed a given threshold, may be an nth number wager (e.g., the wagerer's 10th wager), or may be any other suitable target wager. If the process determines that the wagerer did just place a target amount wager, then process 300 may determine at step 314 that the wagerer is to be provided with a target amount incentive. This incentive may be discounted or free access to the wagering system for a given period of time or any other suitable incentive.

If process 300 determines at step 312 that the wagerer did not just place a target amount wager, then process 300 may proceed to step 316 to determine if the wagerer is a VIP. A VIP may be a wagerer that has qualified for special treatment for wagering in large dollar amounts, wagering consistently over a long period of time, placing a large number or wagers, of meeting any other suitable criteria or criterion. If the process determines that the wagerer is a VIP, then process 300 may determine at step 318 that the wagerer is to be provided with a VIP incentive. This incentive may be an invitation to a special event at a local wagering event location, a free trip to a travel destination, or any other suitable incentive.

If process 300 determines at step 316 that the wagerer is not a VIP, then process 300 may proceed to step 320 to determine if the wagerer subscribed or tuned to a given event. The event may be a wagering event, an event wagerers are likely to watch, or any other event. If the process determines that the wagerer subscribed or tuned to this event, then process 300 may determine at step 322 that the wagerer is to be provided with a viewing incentive. This incentive may be a free wager on the event or any other suitable incentive.

If it is determined at step 320 that the wagerer did not subscribe or tune to the event, the process 300 may terminate at step 326 and return a "NO" value at step 206.

If, on the other hand, any of steps 306, 310, 314, 318, or 322 is performed, after performing the corresponding step, process 300 may terminate at step 324 and return a "YES" value at step 206.

It should be noted that although a particular sequence of steps 304, 308, 312, 316, and 320 is shown in process 300, any of these steps may be omitted and/or these steps may be performed in any suitable order (or in parallel) with minor modification if desired.

It should be apparent to one of ordinary skill in the art that the present invention may be practiced by other than the described embodiments, which are presented for purposes of illustration and not of limitation, and that the present invention is limited only by the claims which follow.

What is claimed is:

1. A method for recognizing a wagerer of an interactive wagering application implemented at least partially on user equipment, comprising:

receiving racing data at the user equipment from a racing data provider, wherein at least a portion of the racing data originates from at least one race track where races corresponding to the received racing data are being run;

allowing a wagerer at the user equipment to place a parimutuel wager on one of the races;

determining if the wagerer is to be recognized based on one criterion of a plurality of criteria, wherein each criterion of the plurality of criteria is associated with a different incentive; and when the wagerer is determined to be recognized based on the one criterion, providing the incentive associated with the one criterion to the wagerer.

2. The method of claim 1, wherein determining whether the wagerer is to be recognized based on the one criterion comprises determining if the wagerer just opened a wagering account.

3. The method of claim 1, wherein determining whether the wagerer is to be recognized based on the one criterion comprises determining if the wagerer just placed a first wager.

4. The method of claim 1, wherein determining whether the wagerer is to be recognized based on the one criterion comprises determining if the wagerer just placed a target amount wager.

5. The method of claim 1, wherein determining whether the wagerer is to be recognized based on the one criterion comprises determining if the wagerer is a VIP.

6. The method of claim 1, wherein determining whether the wagerer is to be recognized based on the one criterion comprises determining if the wagerer subscribed to an event.

7. The method of claim 1, wherein determining whether the wagerer is to be recognized based on the one criterion comprises determining if the wagerer tuned to an event.

8. The method of claim 1, wherein providing the incentive associated with the one criterion to the wagerer comprises greeting the wagerer on television.

9. The method of claim 1, wherein providing the incentive associated with the one criterion to the wagerer comprises greeting the wagerer on a telephone.

10. The method of claim 1, wherein providing the incentive associated with the one criterion to the wagerer comprises providing a free wager.

11. The method of claim 1, wherein providing the incentive associated with the one criterion to the wagerer comprises providing a discount on wagering service.

12. The method of claim 1, wherein providing the incentive associated with the one criterion to the wagerer comprises providing free travel to the wagerer.

13. The method of claim 1, wherein providing the incentive associated with the one criterion to the wagerer comprises providing frequent flier miles to the wagerer.

14. The method of claim 1, wherein providing the incentive associated with the one criterion to the wagerer comprises providing special treatment to the wagerer at a wagering event location.

15. An interactive wagering system that recognizes a wagerer, comprising:
    user equipment configured to:
        receive racing data from a racing data provider, wherein at least a portion of the racing data originates from at least one race track where races corresponding to the racing data are being run, and
        allow a wagerer to place a wager on one of the races; and
    a wagering control system configured to:
        determine if the wagerer is to be recognized based on one criterion of a plurality of criteria, wherein each criterion of the plurality of criteria is associated with a different incentive, and
        when the wagerer is determined to be recognized based on the one criterion, provide the incentive associated with the one criterion to the wagerer.

16. The system of claim 15, wherein the wagering control system, in determining whether the wagerer is to be recognized based on the one criterion, determines if the wagerer just opened a wagering account.

17. The system of claim 15, wherein the wagering control system, in determining whether the wagerer is to be recognized based on the one criterion, determines if the wagerer just placed a first wager.

18. The system of claim 15, wherein the wagering control system, in determining whether the wagerer is to be recognized based on the one criterion, determines if the wagerer just placed a target amount wager.

19. The system of claim 15, wherein the wagering control system, in determining whether the wagerer is to be recognized based on the one criterion, determines if the wagerer is a VIP.

20. The system of claim 15, wherein the wagering control system, in determining whether the wagerer is to be recognized based on the one criterion, determines if the wagerer subscribed to an event.

21. The system of claim 15, wherein the wagering control system, in determining whether the wagerer is to be recognized based on the one criterion, determines if the wagerer tuned to an event.

22. The system of claim 15, wherein the wagering control system, in providing the incentive to the wagerer associated with the one criterion, greets the wagerer on television.

23. The system of claim 15, wherein the wagering control system, in providing the incentive to the wagerer associated with the one criterion, greets the wagerer on a telephone.

24. The system of claim 15, wherein the wagering control system, in providing the incentive to the wagerer associated with the one criterion, provides a free wager.

25. The system of claim 15, wherein the wagering control system, in providing the incentive to the wagerer associated with the one criterion, provides a discount on wagering service.

26. The system of claim 15, wherein the wagering control system, in providing the incentive to the wagerer associated with the one criterion, provides free travel to the wagerer.

27. The system of claim 15, wherein the wagering control system, in providing the incentive to the wagerer associated with the one criterion, provides frequent flier miles to the wagerer.

28. The system of claim 15, wherein the wagering control system, in providing the incentive to the wagerer associated with the one criterion, provides special treatment to the wagerer at a wagering event location.

* * * * *

UNITED STATES PATENT AND TRADEMARK OFFICE
CERTIFICATE OF CORRECTION

| | |
|---|---|
| PATENT NO. | : 7,648,414 B2 |
| APPLICATION NO. | : 09/827657 |
| DATED | : January 19, 2010 |
| INVENTOR(S) | : McNutt et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1314 days.

Signed and Sealed this

Sixteenth Day of November, 2010

David J. Kappos
*Director of the United States Patent and Trademark Office*